United States Patent Office 3,567,762
Patented Mar. 2, 1971

3,567,762
PALLADIUM CATALYZED DIMERIZATION OF
1,2-ALKADIENES
George D. Shier, Midland, Mich., assignor to The Dow
Chemical Company, Midland, Mich.
No Drawing. Filed Mar. 22, 1967, Ser. No. 624,987
Int. Cl. C07c 67/04
U.S. Cl. 260—476                    9 Claims

ABSTRACT OF THE DISCLOSURE 1,2-alkadienes dimerize in the presence of a palladium II salt and an organic carboxylic acid to form a mixture of 1,3-butadiene derivatives including mono- and diesters. These dimers are reactive monomers, cross-linking agents and dienophiles.

BACKGROUND

In U.S. Pat. 3,262,969 Clark & Hayden describe the production of glycol mono- and diesters by reaction of an alkene with a palladium salt, a carboxylic acid and an ionized carboxylate in the presence of a redox system, molecular oxygen and an alkali metal halide. Esters have also been prepared from allene and carbon monoxide using a transition metal catalyst. Other catalytic reactions of allene include the synthesis of trimethylenecyclohexene and formation of a polyallene. However, a selective dimerization has not been previously reported.

SUMMARY OF THE INVENTION

A new catalytic process has been discovered for the dimerization of a 1,2-alkadiene (I) in the presence of an organic carboxylic acid (R'COOH) to yield a mixture of 1,3-butadiene derivavties (II), e.g.

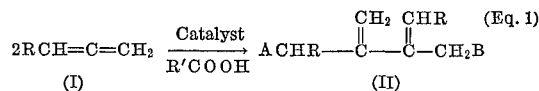
                                                        (Eq. 1)

wherein R is H or $C_1$-$C_3$ alkyl and A and B individually are —H or —OOCR'. The process comprises contacting the 1,2-alkadiene with a mixture of (A) a palladium salt $Pd(Y)_{2/m}$ wherein Y is a weak coordinating anion of valence $m$, and (B) an organic carboxylic acid R'COOH for a time sufficient for dimerization.

Thus reaction of allene with a solution of palladium acetate in acetic acid gives a 50–60% yield of 3-methyl-2-methylene-3-butenyl acetate with smaller amounts of 2,3-methylenetetramethylene diacetate and 2,3-dimethyl-1,3-butadiene. These dimers are reactive monomers, cross-linking agents and dienophiles. Also the esters are easily hydrolyzed to give useful unsaturated diols.

CATALYST

The process requires as a catalyst a combination of certain palladium salts and an organic carboxylic acid. It requires a palladium II salt with a weak coordinating anion Y such as an acetate, benzoate, perchlorate, nitrate, sulfate, fluoroborate, benzenesulfonate, tosylate, or hexafluorophosphate. Particularly desirable is the palladium nitrate or the palladium salt of the organic carboxylic acid used as a coreactant, e.g., Pd(OOCR')$_2$. Indeed when another palladium salt is used in situ formation of the carboxylate salt is probable.

Salts of anions which coordinate strongly with palladium, e.g., chloride, bromide, cyanide, thiocyanate and similar anions with a nitrogen, sulfur or halogen donor atom, are inactive catalysts. In fact the system must be kept free of such anions since they deactivate the catalyst through preferential coordination of the palladium.

The organic carboxylic acid (R'COOH) is a second essential element in the process. A wide range of carboxylic acids can be used, but particularly desirable are liquid carboxylic acids which function both as a reactant and as a solvent. Suitable aliphatic acids include acetic acid, propionic acid, succinic acid, hexanoic acid and adipic acid. Aromatic mono- and dicarboxylic acids including benzoic, terephthalic and o-phthalic acid can also be used. In general $C_1$–$C_8$ mono- and dicarboxylic acids are preferred, although dimerization can be obtained with higher carboxylic acids including palmitic, stearic and linoleic acids.

REACTANTS

The presence of ester groups in product is evidence that the organic carboxylic acid is a reactant as well as an essential part of the catalyst. The other reactant is a 1,2-alkadiene such as allene, methylallene and 1,2-hexadiene. Since simple olefins such as propylene and butylene are essentially inert under normal process conditions, mixtures of a 1,2-alkadiene and such olefins can be used.

PROCESS CONDITIONS

Dimerizaiton occurs most readily when the reactants and catalysts are in solution. Excess acetic or other liquid carboxylic acid is a particularly effective reaction medium. However, water, methanol, n-butyl alcohol, p-dioxane, dimethylsulfoxide and other non-halogen containing liquids can be employed as a solvent or diluent, particularly with a solid acid.

Often it is advantageous to add an alkali metal carboxylate as a buffer against any strong acid. Preferably a soluble sodium or potassium salt of the organic carboxylic acid is used. Indeed, the buffer can be formed in stiu by partial neutralization of the carboxylic acid with an appropriate alkali metal base.

Dimerization can be achieved batchwise or continuously by contacting allene with the palladium catalyst and the carboxylic acid at about 0–100° C., preferably about 30–80° C. for a time sufficient to yield the dimer. Depending particularly on the catalyst concentration and temperature, the reaction may require from several hours to several days.

For a batch run, the reactor is charged with the palladium salt, organic carboxylic acid and any solvent or diluent desired, to give about 1–1000 p.p.m. of the palladium salt and about 0.1–10 parts of the carboxylic acid per part of the 1,2-alkadiene. The buffer when used is preferably about 1–5 moles of alkali metal carboxylate per mole of palladium. The 1,2-alkadiene can be added in any convenient manner and dimerization achieved by contacting the reactants at about 0–100° C. Normally the resulting dimeric product is a mixture of the 1,3-alkadiene (II, A and B=H) and the corresponding mono- and diesters

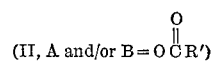

These products are recovered by suitable means. Although the individual components can be separated by fractionation, the mixture is itself reactive as a monomer, cross-linking agent and dienophile. Because of their facile polymerization, excessive heating and contact with air should be avoided and conventional monomer stabilizers such as 2,5-dinitro-o-cresol and t-butylcatechol are advantageously added in a small amount. Also the esters are readily hydrolyzed to the corresponding alcohol or glycol useful in production of polyesters or polyurethanes.

This invention is further illustrated by the following examples. Unless otherwise specified all parts and percentages are by weight.

Example 1.—Pd catalyzed dimerization of allene

A stainless steel bomb was charged with a solution of 0.25 part (1.0 mmole) palladium nitrate dihydrate, 0.5 part (5 mmoles) potassium acetate, 0.25 part o-phthalic acid, 0.1 part 2,5-dinitro-o-cresol and 40 parts glacial acetic acid. The bomb was evacuated, cooled to −78° C. and 47 parts (1.2 moles) of allene added. Then the mixture was agitated at 65° C. for 64 hours. Conversion of allene was quantitative.

The product mixture was washed with water and dilute sodium bicarbonate and then dried. The organic product (63 parts) was distilled and the following dimeric compounds were recovered, purified and identified by standard analytical methods:

7.2 parts 2,3-dimethylenetetramethylene diacetate, M.P. 46° C.;
20.1 parts 3-methyl-2-methylene-3-butenyl acetate, B.P. 52° C./4 mm.; and
4.5 parts 2,3-dimethyl-1,3-butadiene.

In addition 5.7 parts of allyl acetate and 10.4 parts of a distillation residue were obtained.

Refluxing the 3-methyl-2-methylene-3-butenyl acetate with excess methanol containing a trace of sodium hydroxide and t-butylcatechol as a polymerization inhibitor gave the corresponding alcohol 3-methyl-2-methylene-3-buten-1-ol.

Example 2.—Other carboxylic acids (A) The procedure of Example 1 was repeated substituting 40 parts of glacial propionic acid for the acetic acid. After reaction for 64 hours at 80° C. there was obtained 22.5 parts of 3-methyl-2-methylene-3-butenyl propionate B.P. 39° C./0.5 mm.

(B) In a similar manner 20 parts of 3-methyl-2-methylene-3-butenyl butyrate, B.P. 42° C./0.3 mm., was obtained by reaction at 80° C. for 64 hours using 60 parts butyric acid.

(C) The bomb was charged with 0.4 part palladium nitrate dihydrate, 2.0 parts potassium benzoate, 60 parts benzoic acid, 50 parts methanol, 0.2 part 3,5-dinitrocatechol, and 47 parts allene as described in Example 1 and heated at 65° C. for 64 hours with agitation. The reaction mixture was cooled and 8.6 parts of 2,3-dimethylenetetramethylene dibenzoate, M.P. 100.5° C., was recovered. From the mother liquor was recovered 4.7 parts of allyl benzoate and 17.7 parts of 3-methyl-2-methylene-3-butenyl benzoate B.P. 82° C./0.02 mm.

Example 3.—Dimerization of 1,2-butadiene

The procedure of Example 1 was repeated using 25 parts of 1,2-butadiene. The bomb after thoroughly flushing with nitrogen to remove oxygen, was shaken at 60° C. for 48 hours. The crude product was washed with water, sodium bicarbonate, and then with dilute potassium cyanide solution to remove the acetic acid and palladium. After drying, the organic product was distilled to obtain 2.5 parts of 1-methallyl acetate and 7.2 parts of a liquid, B.P. 55–84° C./0.1 mm., identified as a mixture of cis- and trans- 3-methylene-4-methylhex-4-ene-2-yl acetate.

Example 4.—Process variables (A) A study of the dimerization of allene with palladium acetate in acetic acid at 40–60° C. revealed second order kinetics with the rate proportional to the concentration of allene and the palladium salt.

(B) The effect of other anions on the Pd catalyzed dimerization was examined by measuring the rate of allene absorption by a solution of 0.1 part palladium acetate, 0.16 part potassium acetate and 10 parts of glacial acetic acid in contact with allene at 1 atm. at 50° C. Table 1 shows the volume of allene absorbed in 7 hours after addition of various other anions in equimolar ratio with the palladium acetate.

TABLE 1.—ALLENE ABSORPTION

| Added salt | Allene absorbed a, ml. |
| --- | --- |
| None | 344 |
| Potassium nitrate | 287 |
| Potassium benzoate | 305 |
| Potassium hydrogen phthalate | 453 |
| Potassium hydrogen succinate | 272 |
| Potassium chloride | <10 |
| Potassium thiocyanide | <10 |
| Potassium cyanide (2 moles) | None | a Volume in ml. at 23° C., 1 atm.

(C) In a similar manner the effect of added solvents and diluents was observed.

TABLE 2.—ALLENE ABSORPTION

| Solvent/diluent | Acetic Acid, ml. | Cosolvent, ml. | Allene absorbed, ml. |
| --- | --- | --- | --- |
| None | 10 | | 344 |
| 90% formic acid | 0 | 10 | 154 |
| Propionic acid | 0 | 10 | 71 |
| Acetic anhydride | 10 | 5 | 276 |
| 3-methyltetrahydrothiophene-1,1-dioxide | 3.3 | 6.7 | 213 |
| p-Dioxane | 4.0 | 6.0 | 149 |
| Dimethylsulfoxide | 5.8 | 4.2 | 157 |
| n-Butanol | 3.9 | 6.1 | 110 |
| Water | 8.7 | 1.3 | 244 |

I claim:

1. A process for the catalytic dimerization of a 1,2-alkadiene of the formula $RCH=C=CH_2$ wherein R is H or $C_1$–$C_3$ alkyl to form a 1,3-butadiene of Formula II:

$$ACHR-\overset{\overset{CH_2}{\|}}{C}-\overset{\overset{CHR}{\|}}{C}-CH_2B \qquad (II)$$

wherein R is H or $C_1$–$C_3$ alkyl, and A and B individually are H or $$-O\overset{\overset{O}{\|}}{C}R'$$

which comprises contacting said 1,2-alkadiene at a temperature of about 0°–100° C. with a mixture of (A) a palladium salt of the formula $Pd(Y)_{2/m}$ wherein Y is a weak coordinating anion of valence $m$ selected from the group consisting of perchlorate, nitrate, sulfate, fluoroborate, benzenesulfonate, tosylate and $C_1$–$C_{18}$ carboxylate, and (B) a $C_1$–$C_{18}$ hydrocarbon carboxylic acid, R'COOH, to yield a 1,3-butadiene of Formula II.

2. The process of claim 1 wherein the 1,2-alkadiene is allene.

3. The process of claim 1 wherein the palladium salt is palladium nitrate or the palladium salt of the coreactant organic carboxylic acid, R'COOH.

4. The process of claim 1 wherein the carboxylic acid is a $C_1$–$C_8$ carboxylic acid.

5. The process of claim 1 wherein the carboxylic acid is acetic acid.

6. The process of claim 1 wherein the carboxylic acid is benzoic acid.

7. The process of claim 1 wherein about 1–5 moles of an alkali metal salt of the carboxylic acid is incorporated with the mixture of the palladium salt (A) and the carboxylic acid (B).

8. The process of claim 7 wherein allene is contacted with a mixture consisting essentially of a liquid $C_1$–$C_8$ carboxylic acid containing about 1–1000 p.p.m. of the palladium salt (A) and about 1–5 moles of an alkali metal salt of said liquid carboxylic acid per mole of palladium.

9. The process of claim 7 wherein allene is reacted at about 30–80° C. with a solution of palladium acetate in acetic acid containing about 1.0–4.0 moles of potassium acetate per mole of palladium to form a mixture of 2,3-dimethyl-1,3-butadiene, 3-methyl-2-methylene-3-butenyl acetate, and 2,3-dimethylenetetramethylene diacetate.

References Cited

UNITED STATES PATENTS

| | | | |
|---|---|---|---|
| 3,394,170 | 7/1968 | Kohll | 260—491 |
| 3,407,224 | 10/1968 | Smutny | 260—476 |

LORRAINE A. WEINBERGER, Primary Examiner

V. GARNER, Assistant Examiner

U.S. Cl. X.R.

260—410.9, 475, 485, 497, 680